United States Patent
Kaminsky et al.

(10) Patent No.: US 7,321,872 B1
(45) Date of Patent: Jan. 22, 2008

(54) AUTOMATED TRADING EXCHANGE SYSTEM AND METHOD UTILIZING A RANDOMIZED OPENING PROCEDURES

(75) Inventors: Ross G. Kaminsky, Chicago, IL (US); Gordon D. Evora, Chicago, IL (US)

(73) Assignee: Chicago Board Options Exchange, Chicago, IL (US)

( * ) Notice: Subject to any disclaimer, the term of this patent is extended or adjusted under 35 U.S.C. 154(b) by 1447 days.

(21) Appl. No.: 09/699,533

(22) Filed: Oct. 30, 2000

(51) Int. Cl.
G06Q 40/00 (2006.01)
(52) U.S. Cl. .................... 705/37; 705/35; 705/36 R; 705/38
(58) Field of Classification Search ............ 705/26, 705/27, 35, 36, 37, 38, 39, 40, 36 R
See application file for complete search history.

(56) References Cited

U.S. PATENT DOCUMENTS

| | | | | |
|---|---|---|---|---|
| 4,412,287 A | * | 10/1983 | Braddock, III | 705/37 |
| 4,674,044 A | * | 6/1987 | Kalmus et al. | 705/37 |
| 5,557,517 A | * | 9/1996 | Daughterty, III | 705/37 |
| 5,924,082 A | * | 7/1999 | Silverman et al. | 705/37 |
| 6,014,643 A | * | 1/2000 | Minton | 705/36 R |
| 6,016,483 A | * | 1/2000 | Rickard et al. | 705/37 |
| 6,195,647 B1 | * | 2/2001 | Martyn et al. | 705/36 R |
| 6,230,146 B1 | * | 5/2001 | Alaia et al. | 705/37 |
| 6,272,474 B1 | * | 8/2001 | Garcia | 705/36 R |
| 6,321,212 B1 | * | 11/2001 | Lange | 705/36 R |
| 6,493,682 B1 | * | 12/2002 | Horrigan et al. | 705/36 R |
| 6,505,174 B1 | * | 1/2003 | Keiser et al. | 705/36 R |
| 6,618,707 B1 | * | 9/2003 | Gary | 705/37 |
| 7,099,839 B2 | * | 8/2006 | Madoff et al. | 705/37 |

FOREIGN PATENT DOCUMENTS

| | | | |
|---|---|---|---|
| EP | 752135 A1 | * | 1/1997 |
| WO | WO 0237396 | * | 5/2002 |
| WO | WO 0277766 | * | 10/2002 |

OTHER PUBLICATIONS

"smartRay.com Delivers Stock Quotes and Financial Information to Wireless Devices for Free !", PR Newswire, p. 2870, Dec. 16, 1999.*
Tsang, Raymond, "Open outcry and electronic trading in futures exchanges", Bank of Canada Review, pp. 21-39, Spring 1999.*

(Continued)

*Primary Examiner*—Nga Nguyen
(74) *Attorney, Agent, or Firm*—Brinks Hofer Gilson & Lione

(57) ABSTRACT

A method of opening option trading in an automated exchange trading system. The system receives orders and quotes and matches the orders and quotes to generate trades. The method includes the step of accepting, during a first time period, quotes and orders associated with an option class. The first time period precedes the opening of trading. An opening value of an underlying security is received and opening prices for a number of option series in the option class are determined. Additional quotes and orders are received during a second time period and the opening prices are responsively updated. The second time period is terminated at a randomly selected time and opening rotations begin.

11 Claims, 3 Drawing Sheets

OTHER PUBLICATIONS

Glen, Jack D, "Trading and information systems in two emerging stock markets", East Asian Executive Reports, v16n12, pp. 8, 14+, Dec. 15, 1994.*

Michaels, Jenna, "NASD'S Global Fumble", Wall Street & Technology, v9n11, pp. 57-62, Jul. 1992.*

"PHLX Files Rule Canges to Improve Hanling Orders on Pace", Securities Week, p. 5, Jul. 17, 1989.*

"NYSE Votes to Restrict Comupterized Trading", San Jose Mercury News, Feb. 5, 1988.*

* cited by examiner

AUTOMATED TRADING EXCHANGE SYSTEM AND METHOD UTILIZING A RANDOMIZED OPENING PROCEDURES

A. FIELD OF THE INVENTION

The present invention relates to financial trading systems. More specifically, it is directed to a method and device for automatically establishing opening trading prices for one or more option series.

B. DESCRIPTION OF THE RELATED ART

1. Option Trading

Option contracts are traded publicly on many exchanges throughout the world. These securities, referred to generally as "options," convey certain rights to buy or sell an underlying stock, commodity, or other security at a fixed price for a specific period of time—until expiration for an American-style option or at expiration for a European-style option. All option contracts that trade on U.S. securities exchanges are issued, guaranteed and cleared by the Options Clearing Corporation (OCC). OCC is a registered clearing corporation with the SEC.

The potential loss to the buyer of an option can be no greater than the initial premium paid for the contract, regardless of the performance of the underlying stock. This allows an investor to control the amount of risk assumed. On the contrary, the seller of the option, in return for the premium received from the buyer, assumes the risk of being assigned the obligation to buy or sell the underlying security if the contract is exercised. Therefore, writing options can lead to large potential exposure.

Further background information may be obtained from the book "OPTIONS, Special Concepts and Trading Strategies," The Options Institute, The Educational Division of the Chicago Board Options Exchange, Second Edition, McGraw Hill (1995), the contents of which are incorporated herein by reference.

2. Open Outcry Trading

Many trading systems utilize what is known as an open outcry method of trading. In the open outcry system, market-makers are required to make a two-sided market by providing a bid and offer quote in all option series. The market-makers typically communicate verbally or visually with contra traders indicating their willingness to buy and sell various quantities of securities. Because the market-makers have personal control over the types and number of contracts traded, they can adjust their trading strategies as their positions change. In this way, the market-makers can manage their exposure, or risk, associated with their holdings by adjusting their quotes to favor trades that would tend to hedge away unwanted exposure.

3. Option Trading Opening by Manual Rotation

Option trading does not begin until the underlying security has opened trading. Option trading opening, commonly referred to as "rotations" has traditionally been performed manually at the Chicago Board Options Exchange. The price for each individual option series (the series specifies the strike price, expiration date, and whether it is a call or put option), is determined by negotiation for each series in a serial manner, with each series being opened in a prescribed succession. This series-by-series opening process can be a lengthy labor-intensive process.

Although this system normally provides an adequate pricing mechanism to open trading, it is subject to degradation during periods of intense volatility. The experience of the 1987 market turmoil led to the development of the Lead Market Maker System in OEX to speed up the manual rotation process. It is expected that during market stress certain difficulties, specifically delays, with opening equity classes will be experienced.

In manual rotation openings, an undesirable situation may result in a volatile market due to what is referred to as relative pricing. Each series is typically priced or quoted in relation to the underlying instrument at the time each series is called for rotation. Because the underlying instrument can change quickly over time near the opening, a rotation that extends over a long time period will result in individual series being quoted with reference to different values of the underlying instrument. This condition may lead to perceived inequities in some prices and reduces customer confidence in the marketplace.

4. Automated Option Trading Opening

An automated opening method is shown in U.S. Pat. No. 6,016,483 to Rickard et al., the contents of which are incorporated herein by reference. Rickard et al. shows a two-stage method by which a set of opening prices is determined during a first stage and a residual balance of non-executed public orders is assigned among participating market makers during a second stage. With respect to the first stage, i.e. the setting of opening prices, an order entry system receives public orders and market maker orders and determines opening prices to maximize a weighted volume of trades. Rickard et al. further note that the supply and demand for the option and the underlying depth of the market for the option is a non-quantifiable factor that may influence an option's opening price.

A disadvantage of the method shown by Rickard et al. is that an opening price is subject to manipulation as a result of a misrepresentation of the supply, demand or the underlying depth of the market for the option. It would be desirable to have an automated system that reduces the potential for manipulation of opening prices.

SUMMARY OF THE INVENTION

A method for an automated trading exchange having a randomized rapid opening service is provided.

In accordance with a first aspect of the invention, a method of opening option trading in an automated exchange trading system is provided. The method includes receiving quotes and orders associated with an option class during a first time period. The first time period is prior to the opening of trading, during which an opening value and/or market quote of an underlying security is received. Expected opening prices for a number of option series in the option class are determined. Additional quotes and orders associated with the option class are received during a second time period. The opening prices are updated in accordance with the additional quotes and orders. The second time period is randomly terminated, such that quotes and orders received after termination do not affect the opening prices. Trading is opened for the option series based on the updated opening prices.

In accordance with a second aspect of the invention, a method of opening option trading is provided. The method includes receiving quotes and orders associated with an option class during a first time period prior to the opening of option trading. An opening value or market quote for a security or securities associated with the option class is also received. An expected opening price for a number of option series in the option class is calculated. The expected opening price is published during a second time period and, during that time period, additional quotes and orders are received. The second time period is terminated at a randomly determined time to open trading of the option series.

BRIEF DESCRIPTION OF THE DRAWINGS

The objects, features and advantages of the present invention will be more readily appreciated upon reference to the following disclosure when considered in conjunction with the accompanying drawings, in which.

DETAILED DESCRIPTION OF THE PRESENTLY PREFERRED EMBODIMENT(S)

Figure 1:
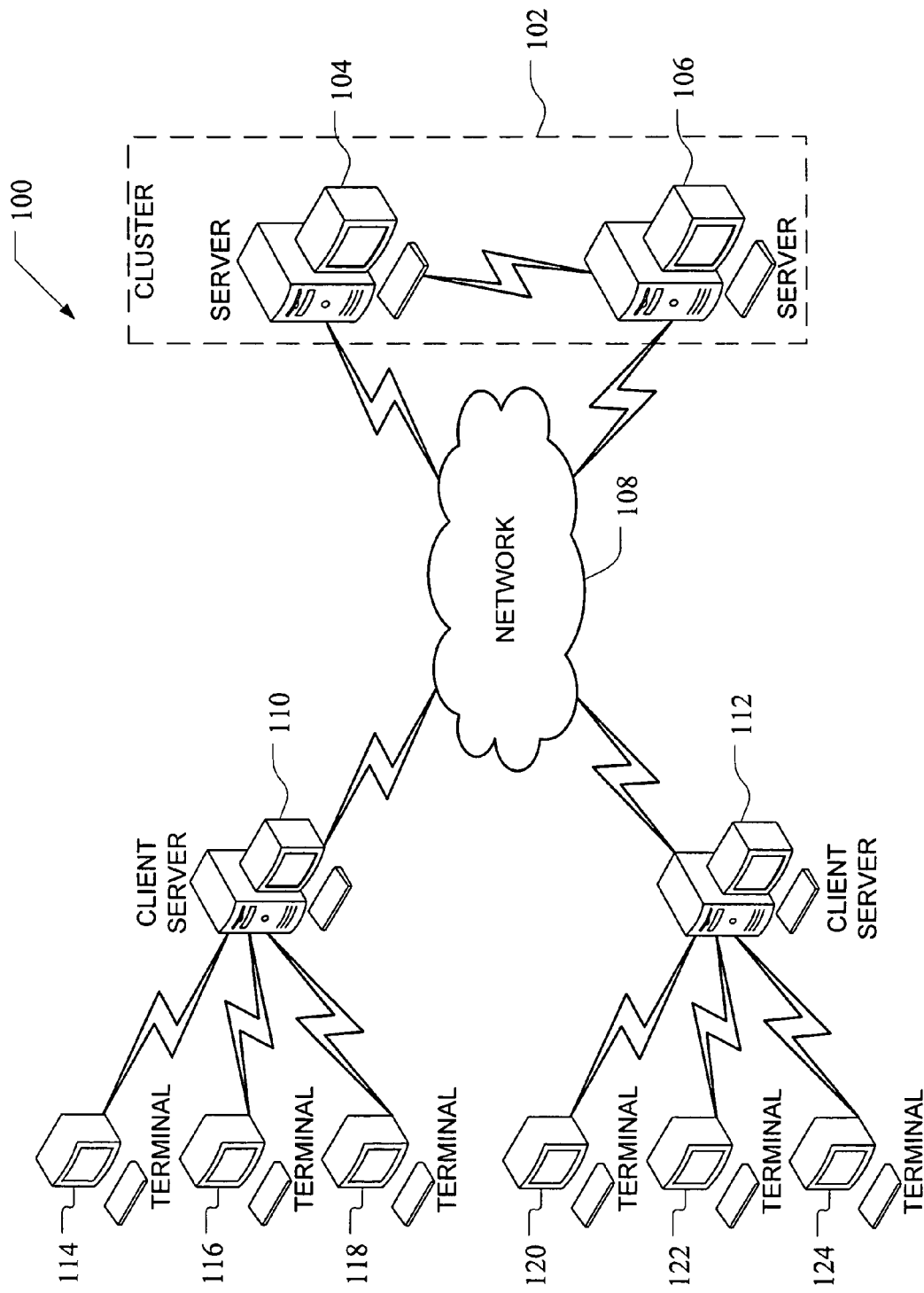
FIG. 1 depicts a preferred embodiment of the automated trading system.

With reference to FIG. 1, a preferred embodiment of an automated exchange system 100 utilized for option trading is described. The system 100, also referred to herein as a screen-based trading system or SBT system, includes a plurality of interconnected computers, which may include one or more workstations, servers, mainframes, or other computer hardware platforms that provide sufficient resources to meet the desired trading volume and desired transaction-processing rate. In the preferred embodiment shown in FIG. 1, the system includes a number of computer clusters such as the cluster 102 (although only one is depicted in FIG. 1), where each cluster 102 handles trading for a number of securities, such as one or more classes of options. In the preferred embodiment, each cluster 102 is made up of two servers 104, 106. The servers 104, 106 are preferably multiprocessor SUN 4500 servers available from SUN Microsystems of Palo Alto, Calif. SUN Enterprise™ servers, Starfire™ servers, or other servers of superior processing power and reliability are suitable alternatives.

The servers 104 and 106 in cluster 102 communicate with a plurality of client servers, such as the client servers 110 and 112, that are typically located at remote locations, such as at a brokerage house, but may also be located in the same facility as the clusters 102. A network 108 facilitates communication between the clusters 102 and the client servers 110, 112. The network 108 is preferably a private LAN/WAN configuration, but a public network may be utilized, provided sufficient redundancies and message security are provided. Each client server 110, 112 may be provided with a predetermined message throughput rate into network 108, where the throughput rate may be a maximum rate determined by various parameters, including the volume of orders sent by the client server 110, 112, the volume of quotes sent by the client server 110, 112, the number of option series for which quotes are provided, communication/connection fees paid by the brokerage house or other entity utilizing the client server 110, 112, the overall capacity of the trading system 100, etc. The client servers 110, 112 preferably communicate with other elements of the automated exchange system using a client application server module, as further described below, running on client servers 110, 112.

Each client server 110, 112 is capable of serving a number of clients, shown in FIG. 1 as terminals 114, 116, 118, 120, 122, and 124. The client terminals 114-124 may be "dumb" terminals, stand alone computing devices (PCs or workstations), or even portable wireless terminals or PDAs.

The client servers 110, 112 may communicate with the client terminals 114-124 using a proprietary protocol or one of many standard public domain protocols. The client servers 110, 112 may include a web server or connect to a separate web server for processing tcp/ip, http, html, java, and the like, and provide access to client terminals 114-124 over the Internet in addition to (or as an alternative to) private LAN/WAN or Virtual Private Network access. For embodiments that include a web server, the web server preferably utilizes common gateway interface scripts (cgi) to interface with the client application server 110, 112. In addition to cgi scripts, or as an alternative to cgi, other web server interfaces and server extensions may be utilized to provide communication between the web server and the client application server 110, 112. The client servers 110, 112 preferably communicate with the users of terminals 114-124 by way of secure Internet communication protocols or by private LAN/WAN or VPN communication links. Thus the client terminals 114-124 may run dedicated proprietary software to communicate with the client server 110, 112, or may interface with client servers 110, 112 via a standard web browser. The web browser may operate using built-in java scripts, or may also include specialized browser modules that are provided to the client terminals.

An automated system that is suitable for the present application is set forth in U.S. patent application Ser. No. 09/475,534, filed Dec. 28, 1999, entitled "Automated Trading Exchange System Having Integrated Quote Risk Monitoring And Integrated Quote Modification Services," the entire contents of which are incorporated herein by reference.

Figure 2:
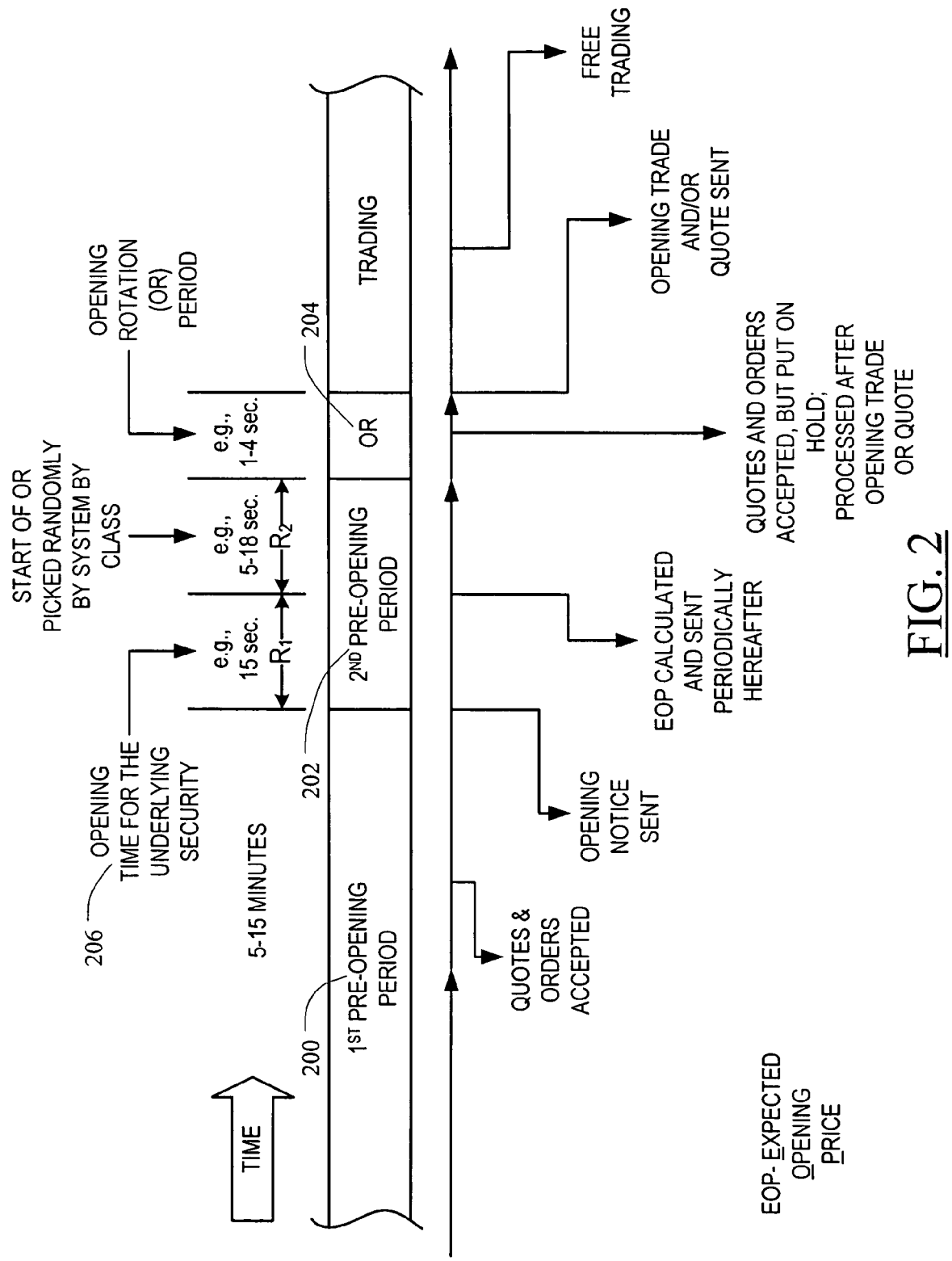
FIG. 2 shows a timing diagram depicting events associated with a randomized opening method.

In accordance with a preferred embodiment, the automated exchange system 100 is programmed to open option trading using a randomized opening method as described below. FIG. 2 is a timing line depicting events associated with the randomized opening method. With reference to FIG. 2, an option class opening is divided into three phases: a first pre-opening period 200, a second pre-opening period 202, and an opening rotation period 204. The first pre-opening period 200 extends until the opening time 206 of the underlying security or securities. During the first pre-opening phase 200, quotes and orders may be entered for option series within the option class. The first pre-opening period 200 has a first time duration that is preferably a period of five to fifteen minutes and, as shown in FIG. 2, terminates upon the opening time 206 of the underlying security. The first time duration may be longer or shorter, depending upon the desired characteristics of the automated exchange system 100. The system 100 preferably displays resting good-till-canceled or "GTC" orders in the book that remain from the prior business day and any orders and quotes sent in during the first pre-opening phase 200.

When the primary market disseminates the opening trade or the opening quote (not including pre-opening indications from the primary market) of the underlying security, the system 100 enters the second pre-opening phase 202. Early in the second pre-opening period 202, the system 100 sends an opening notice to market makers who have an appointment in that issue. Market makers submit their opening quotes, either by manual entry or programmatically via a market maker's API for quote entry. During the second pre-opening phase 202, the system accepts quotes and orders and displays them in the book. After a first predetermined period, $n_1$, within the second pre-opening phase 202, the system begins to calculate and disseminate an expected opening price ("EOP") based on the current resting orders. In accordance with a preferred embodiment, the first predetermined period, $n_1$, is 15 seconds, as shown in FIG. 2. The first predetermined period, $n_1$, alternatively may be either shorter or longer than 15 seconds.

Upon the conclusion of the first predetermined period, $n_1$, the system enters a second period, $n_2$, during which the system recalculates the EOP and disseminates an updated EOP, preferably no less frequently than every two to three seconds. Notably, the second period, $n_2$, is of random length. In accordance with a preferred embodiment, the second period, $n_2$, terminates at a random time within the range of 5 seconds to 18 seconds, as further described below. The duration of the second period, $n_2$, alternatively may be less than 5 seconds or greater than 18 seconds.

The end of the second pre-opening phase 202, and consequently the end of the second period, $n_2$, is concurrent with the beginning of the opening rotation phase 204. The time at which the opening rotation phase 204 begins is selected randomly. That is, the system sets the starting time of the opening rotation phase 204 at a randomly selected time, preferably between twenty and thirty-three seconds after the receipt of the underlying security's opening price 206. The random setting is designed to prevent traders from strategically submitting and canceling orders to influence the opening price. As noted above, alternative embodiments may include a second pre-opening phase 202 that is either less than twenty seconds duration or greater than thirty-three seconds duration.

Expected Opening Price Determination

The Expected Opening Price (EOP) can only be calculated if an opening trade is possible. If the EOP cannot be calculated or there is more than one EOP, the system disseminates an EOP of zero. Two conditions are required for an opening trade to happen.

a) The book is crossed (highest bid higher than lowest offer), locked (highest bid equals lowest offer), or there are market orders present.

b) At least one standard quote must be present. A pair of buy and sell orders, each not a part of a quote, separated by the prescribed width, is not sufficient. A standard quote, as used herein, is a quote made up of a bid and an offer separated by an exchange prescribed width and having a prescribed minimum size.

At the designated start time of the opening rotation phase 204, the system changes the product state of the class and its series to opening rotation and begins to establish the opening price by series. Depending on the number of orders and opening trades the opening rotation for a class is expected to take 1-4 seconds, except in unusual market conditions. The system preferably processes the series within a class in a random order, to further minimize the possibility of pricing manipulation. The opening price of a series is the "market-clearing" price that leaves bids and offers that cannot trade with each other. Execution priority is given to market orders first, then to limit orders whose price is better than the opening price, and then to limit orders at the opening price.

During the opening rotation phase 204 the system accepts quotes and orders. However, they are placed in a queue or buffer and will not participate in the opening trade. As the opening rotation is completed by series, the system changes the product state of the series to "Trading," and disseminates to OPRA and to the SBT participants the opening quote and the opening trade price, if any. Fills for orders that participated in the opening trade are transmitted. The system then submits to the book in the order of their arrival the quotes and orders which were put on hold during the opening rotation. When all the series of a class are open, the system changes the product state of the class to Open. It is possible that not all the series in a class can open.

The system does not open the series under any one of the following conditions.

a) An opening trade is possible but there is no standard quote present.

b) An opening trade is possible, there is a standard quote present, but the opening price is not within the acceptable range. The upper boundary of the acceptable range is n(125)% of the highest quote offer and the lower boundary is n(75)% of the lowest quote bid. In this example, although the acceptable range is referred to as the range from 75% of the highest quote offer, it is to be understood that other boundary values may alternatively be used and the boundaries are preferably configurable.

c) The opening trade would leave a market that has a market order imbalance.

d) There are two or more possible opening prices that have identical highest matched quantity.

e) The expected opening price of the series does not meet the following rule:

A series with a price of $1 or more shall not open at a price higher than the offer on the next most out-of-the-money series in the same month, if such a series exists, nor lower than the bid on the next most in-the-money series in the same month, if such a series exists.

Under any one of these conditions, the system does not open the series. The system sends an opening request for quote (RFQ) with zero size and with a brief message relating to the exception condition. If the condition is market order imbalance, the net imbalance quantity is disseminated as the RFQ size and its direction (buy or sell) is included. At the end of the RFQ period, the system puts the series into opening rotation. The system repeats this procedure until the series is open.

For series that do not have an opening trade, the system preferably disseminates an opening quote and opens the series. The opening quote is made-up of the best bid and the best offer at the time of the opening.

During the opening procedure, the system disseminates for each series the top of the book prices and quantities as they get updated. The book depth is preferably also available upon request.

Alternative embodiments may include using different, generally shorter, time (n) values. In addition, to increase the unpredictability of the time at which the opening rotation begins, an alternative embodiment may disseminate the first EOP after a randomly selected time period n, where n is between 10 to 15 seconds after the opening value or quote is received. For this embodiment, the system then sets the starting time of the opening rotation phase at a randomly selected time, beginning not less than five seconds after the first dissemination of the EOP and preferably between fifteen and thirty-three seconds after the receipt of the underlying security's opening price or quote.

Figure 3:
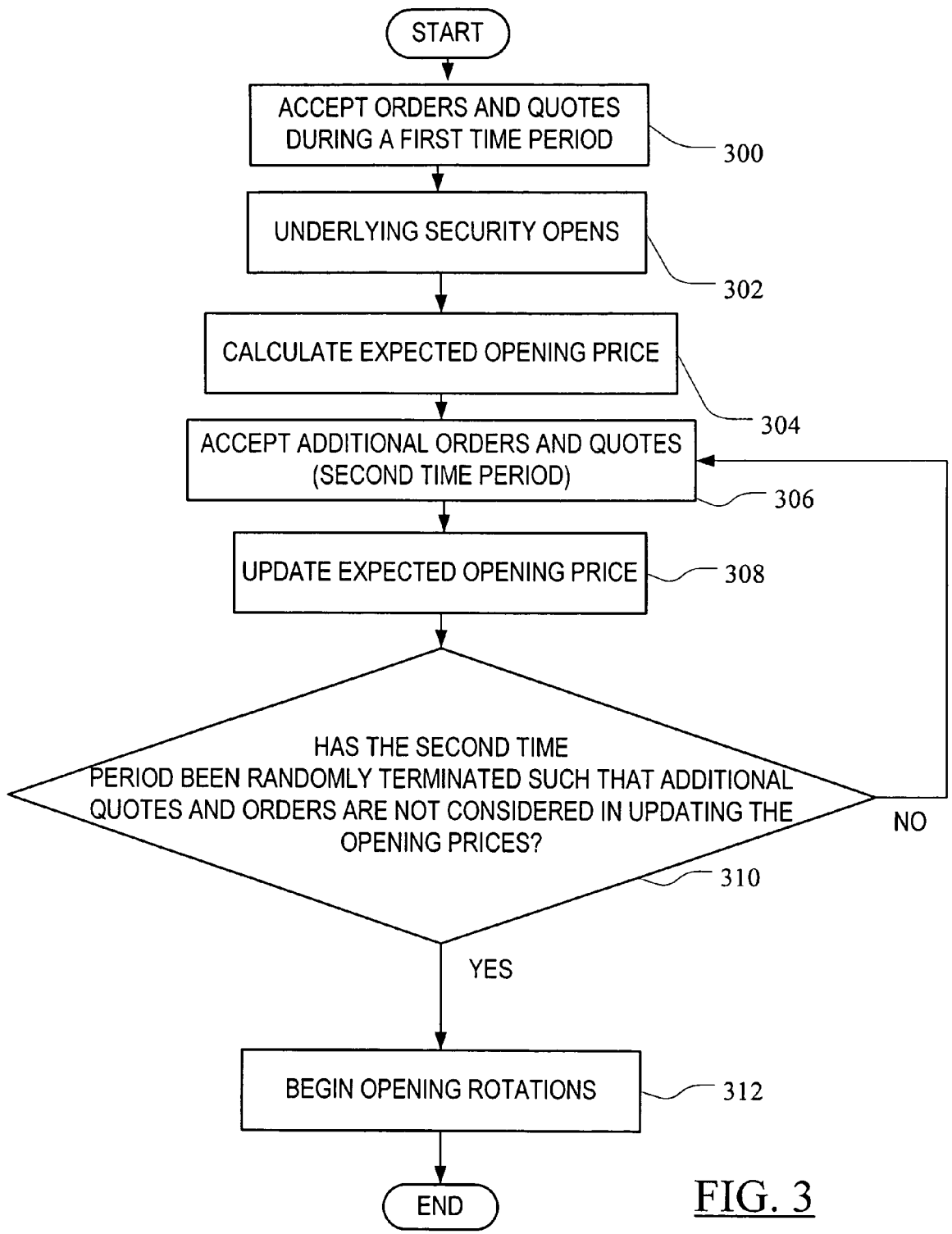
FIG. 3 is a flow chart illustrating steps associated with a preferred method of opening option trading.

FIG. 3 is a flow chart illustrating steps associated with one preferred method of opening option trading. At step 300, orders and quotes are accepted during a first time period. The orders and quotes are, in accordance with a preferred embodiment, associated with an option class. An opening trade or opening quote for an underlying security or securities associated with the option class is received at step 302. At step 304, an opening price is determined for one or more option series within the option class. Once determined, the opening price is preferably disseminated. Additional quotes and orders associated with the option class are received during a second time period at step 306, and the opening prices are updated at step 308 in accordance with the additional quotes and orders.

At step 310, the second time period is terminated at a randomly selected time, such that additional quotes and orders are no longer considered in updating the opening prices. Opening rotations begin at step 312 upon the termination of the second time period.

Preferred embodiments of the present invention have been described herein. It is to be understood, of course, that changes and modifications may be made in the embodiments without departing from the true scope of the present invention, as defined by the appended claims. The present embodiment preferably includes logic to implement the described methods in software modules as a set of computer executable software instructions. A Central Processing Unit ("CPU"), or microprocessor, implements the logic that controls the operation of the servers 104, 106. The microprocessor executes software that can be programmed by those of skill in the art to provide the described functionality.

The software can be represented as a sequence of binary bits maintained on a computer readable medium including magnetic disks, optical disks, and any other volatile (e.g., Random Access memory ("RAM")) or non-volatile firmware (e.g., Read Only Memory ("ROM")) storage system readable by the CPU. The memory locations where data bits are maintained also include physical locations that have particular electrical, magnetic, optical, or organic properties corresponding to the stored data bits. The software instructions are executed as data bits by the CPU with a memory system causing a transformation of the electrical signal representation, and the maintenance of data bits at memory locations in the memory system to thereby reconfigure or otherwise alter the unit's operation. The executable software code may implement, for example, the methods as described above.

It should be understood that the programs, processes, methods and apparatus described herein are not related or limited to any particular type of computer or network apparatus (hardware or software), unless indicated otherwise. Various types of general purpose or specialized computer apparatus or computing device may be used with or perform operations in accordance with the system and methods described herein.

It should be understood that a hardware embodiment may take a variety of different forms. The hardware may be implemented as an integrated circuit with custom gate arrays or an application specific integrated circuit ("ASIC"). Of course, the embodiment may also be implemented with discrete hardware components and circuitry. In particular, it is understood that the logic structures and method steps described herein may be implemented in dedicated hardware such as an ASIC, or as program instructions carried out by a microprocessor or other computing device.

The claims should not be read as limited to the described order of elements unless stated to that effect. In addition, use of the term "means" in any claim is intended to invoke 35 U.S.C. § 112, paragraph 6, and any claim without the word "means" is not so intended. Therefore, all embodiments that come within the scope and spirit of the following claims and equivalents thereto are claimed as the invention.

We claim:

1. A computer-implemented method of opening trading in an automated exchange trading system that receives orders and quotes, and matches the orders and quotes to generate trades, comprising the steps of:

accepting quotes and orders associated with an option class during a first time period prior to the opening of trading;

receiving an opening value of an underlying security;

determining opening prices for a plurality of option series in the option class;

receiving additional quotes and orders associated with the option class during a second time period and responsively updating the opening prices prior to the opening of trading;

randomly terminating the second time period prior to an opening rotation period such that further additional quotes and orders are not considered in updating the opening prices; and opening trading of the plurality of option series based on the updated opening prices.

2. The method of claim 1 wherein the step of determining the opening prices is based on maximizing the number of contracts traded at the opening.

3. The method of claim 1 wherein the step of responsively updating the opening prices comprises recalculating the opening prices based upon quotes and orders received during the second time period.

4. The method of claim 1 wherein the step of randomly terminating the second time period occurs not less than approximately five seconds after the step of receiving the opening value of the underlying security.

5. The method of claim 1 wherein the opening value is one of a) an opening quote, b) an opening trade or c) an opening quote and an opening trade.

6. The method of claim 1, wherein the step of opening trading comprises opening trading on a plurality of option series in a random order.

7. A computer-implemented method of opening option trading, comprising the steps of:

receiving quotes and orders associated with an option class during a first time period prior to the opening of option trading;

receiving an opening value of a security associated with the option class;

calculating an expected opening price for a plurality of option series in the option class;

publishing the expected opening prices during a second time period prior to the opening of trading;

receiving additional quotes and orders associated with the option class during a second time period prior to the opening of trading;

randomly terminating the second time period prior to open trading of the plurality of option series such that further additional quotes and orders received after termination of the second time period are not reflected in the expected opening prices.

8. The method of claim 7, further comprising the step of updating the expected opening prices prior to opening of trading based on the Additional quotes and orders received during the second time period.

9. The method of claim 8, wherein an opening rotation period immediately follows the step of randomly terminating the second time period.

10. The method of claim 9, wherein orders and quotes received during the opening rotation period are not considered during the step of updating the expected opening prices prior to the opening of trading.

11. The method of claim 8, wherein the expected opening prices are updated periodically based upon the additional quotes and orders.

* * * * *

UNITED STATES PATENT AND TRADEMARK OFFICE
CERTIFICATE OF CORRECTION

PATENT NO. : 7,321,872 B1
APPLICATION NO. : 09/699533
DATED : January 22, 2008
INVENTOR(S) : Ross G. Kaminsky et al.

It is certified that error appears in the above-identified patent and that said Letters Patent is hereby corrected as shown below:

On the Title Page

Item (54), after "RANDOMIZED OPENING" replace "PROCEDURES" with --PROCEDURE--.

Column 1, in the title, after "RANDOMIZED OPENING" replace "PROCEDURES" with --PROCEDURE--.

Signed and Sealed this

Twelfth Day of October, 2010

David J. Kappos
*Director of the United States Patent and Trademark Office*